Nov. 28, 1967 SHOZO ARATANI ET AL 3,355,547

OPEN LOOP SERVO SYSTEM FOR MAGNETIC TAPE RECORDING AND REPRODUCING APPARATUS

Filed Oct. 18, 1963 3 Sheets-Sheet 1

Inventors
Shozo Aranti
Toshio Morita
By Stevens, Davis, Miller & Mosher
ATTORNEYS Inventors
Shozo Aranti
Toshio Morita
By Stevens, Davis, Miller & Mosher
ATTORNEYS Inventors
Shozo Aratani
Toshio Morita
By Stevens, Davis, Miller & Mosher
ATTORNEYS United States Patent Office 3,355,547
Patented Nov. 28, 1967

3,355,547

OPEN LOOP SERVO SYSTEM FOR MAGNETIC TAPE RECORDING AND REPRODUCING APPARATUS

Shozo Aratani, Osaka, and Toshio Morita, Moriguchi-shi, Japan, assignors to Matsushita Electric Industrial Co., Ltd., Osaka, Japan, a corporation of Japan Filed Oct. 18, 1963, Ser. No. 317,212
Claims priority, application Japan, Oct. 20, 1962, 37/47,055, 37/47,056
5 Claims. (Cl. 178—6.6)

ABSTRACT OF THE DISCLOSURE

An improved control system for a rotary head type magnetic recording and reproducing apparatus comprising a synchronous motor driving a rotary magnetic head for recording a video signal on a magnetic tape fed by said head at a fixed speed and reproducing the recorded signal. The synchronous motor comprises a rotor including magnetic poles at specified angular positions along the periphery and a stator exciting circuit having a semiconductor switching circuit, the semiconductor switching circuit being controlled in the manner of an open loop system by a reference signal in either of the recording or reproducing operations.

This invention relates to the controlling of magnetic tape recording and reproducing apparatus and particularly to those for recording and reproducing wide-band signals, comprising a rotary head including a magnetic transducer, means for driving said rotary head including an electric motor the rotor of which has magnetic poles at particular angular positions and is rotatable in synchronism with external signals, and means for controlling said rotary head solely through the medium of reference signals.

In previous magnetic tape sound recording systems for recording signals of extremely high frequency signals, such as television signals or signals having an extremely wide frequency band, directly on a magnetic tape, the magnetic medium traveling through the gap of the recording or reproducing head must have an extremely high relative speed for reproduction of the high frequency portions of the signals recorded. On the other hand, the magnetic medium such as a magnetic tape is required to run at an ordinary low speed. The above two requirements have been met by rotating the magnetic head at high speed in a direction transverse of the tape thereby to obtain a required relative speed between the tape and the magnetic head. Ordinarily, the tape has been driven in its longitudinal direction to pass through the head at a speed of 15 inches per second so that the signals are recorded as a series of transverse lines or tracks. In a magnetic recording and reproducing apparatus having such a rotary head, if it is required to control the rotation speed or phase of rotation of the motor for tape drive and the rotary head, an error signal has been employed to control the rotation of the rotary head, which signal is obtained by comparison between a reference signal and a signal depending upon rotation of the rotary head. However, an apparatus employing such measures has necessitated an increased number of parts and hence a complicated construction making the entire apparatus expensive.

In view of these deficiences of previous techniques, the present invention has for its primary object to provide an improved magnetic tape recording and reproducing apparatus for recording and reproducing wide-band signals and comprising a rotary head including a magnetic transducer, and means for controlling the rotary head in a manner so that the head effects sweep continuously across the magnetic tape at an angle to its longitudinal axis.

Another object of the present invention is to provide an apparatus of the character described which employs a reference signal source of a periodic character and an electric motor for driving the rotary head and operable in synchronism with the signals responsive to said source and including a rotor characterized so as to have magnetic poles at particular angular positions, whereby the reference signal and the rotation of the rotary head have a fixed phase relation.

A further object of the present invention is to provide an apparatus of the character described which employs an electric motor of the character described operable to drive the rotary head in synchronism with signals responding to a record-signal source of a periodic character whereby a recording track is formed on the magnetic tape by the rotary head, which is secured to the motor shaft.

Yet another object of the present invention is to provide an apparatus of the character described for recording and reproducing television signals in which said electric motor is operable in synchronism with signals responding to the synchronizing signal of the television system so that recording tracks of the television signals are formed on the magnetic tape by means of the rotary head, which is secured to the motor shaft.

A still further object of the present invention is to provide an apparatus of the character described for recording and reproducing television signals in which the television signals are recorded on the magnetic tape by means of the rotary head adapted to be driven by an electric motor operable in synchronism with the synchronizing signal of the television system and which comprises means for drawing an electric signal dependent upon the rotation of said rotary head and recording the signal along one edge of the magnetic tape.

Another object of the present invention is to provide an apparatus of the character described for recording and reproducing of wide-band signals in which recording is effected on the magnetic tape by use of a rotary head driven by an electric motor operable in synchronism with a source of signals to be recorded having a periodic character and an electric signal dependent upon rotation of said rotary head is recorded along one edge of said magnetic tape, said electric motor is driven for reproduction to rotate the rotary head for reproducing the record tracks on the magnetic tape under control of a signal reproduced fom the record of said electric signal.

Other objects, features and advantages of the present invention will become apparent from the following description when taken in conjunction with the accompanying drawings, which illustrate some preferred embodiments of the invention and in which.

The apparatus illustrated in FIGS. 4 to 9 includes a motor for driving the rotary head drum and one for driving the tape, both motors being adapted to be driven in a simplified manner, having a low maintenance cost, simple structure, and being inexpensive and having a satisfactory performance.

Conventional techniques of controlling magnetic recording and reproducing apparatus will first be described in further detail for better understanding of the present invention though they have been described hereinbefore in more or less detail.

Figure 1:
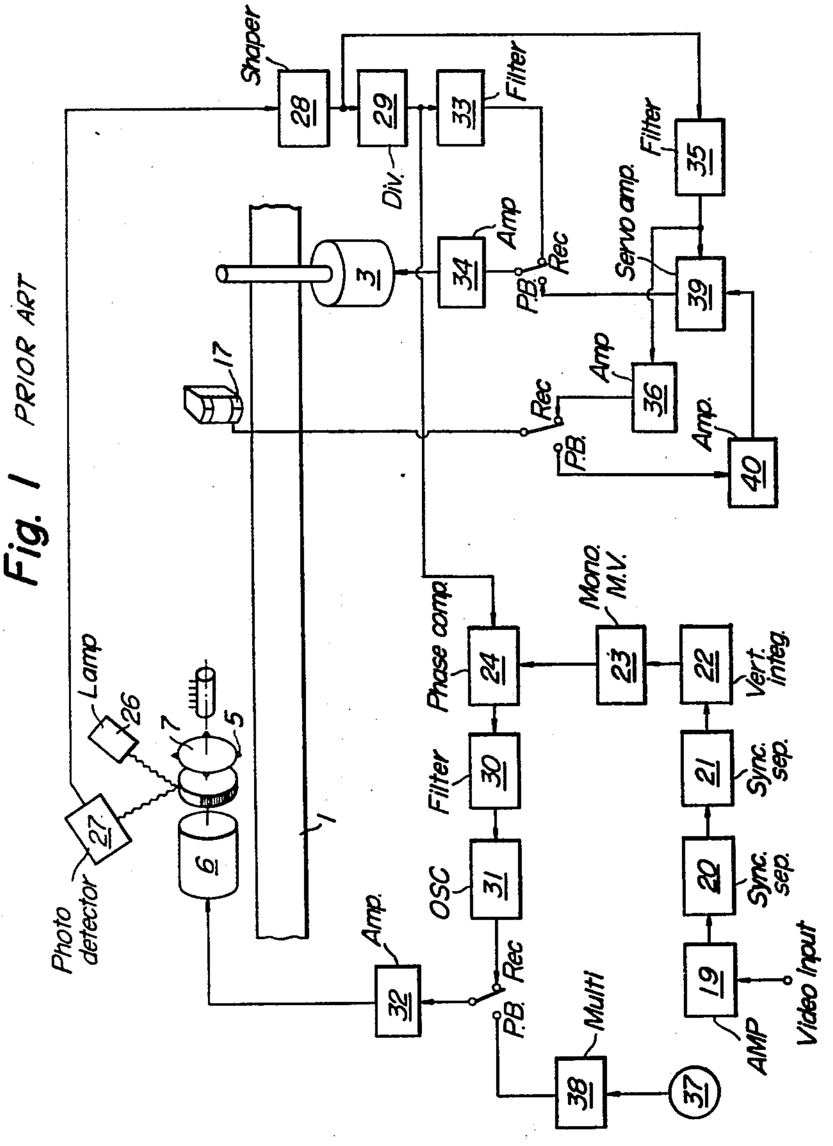
Fig. 1 PRIOR ART
FIG. 1 is a block diagram schematically illustrating one example of a control system in the conventional magnetic recording and reproducing apparatus.
Figure 2:
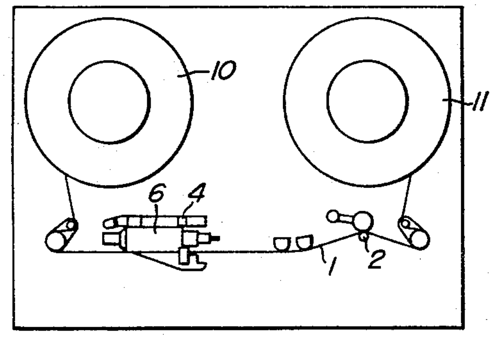
Fig. 2 PRIOR ART
FIG. 2 is a plan view showing the tape-conveying arrangement of the apparatus shown in FIG. 1.
Figure 3:
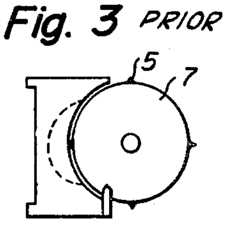
Fig. 3 PRIOR ART
FIG. 3 is an end elevational view showing the tape guide and the head drum in FIGS. 1 and 2.

In one example of the conventional control system, shown in FIGS. 1 to 3, the magnetic tape 1 is drawn from a pay-out reel 10 to pass over the transducer head section 4 under the drive of a capstan mechanism 2 and is wound on a take-up reel 11. The transducer head section includes a head drum 7 having a plurality of transducer heads 5 and a synchronous motor 6 for driving the drum. During the recording or reproduction, the speeds of rotation of the head drum 7 and capstan 2 are held in a relation as described hereinafter, and a control signal is deduced from the video input signal to serve the purpose. Namely, during the recording operation, the video signal is fed to an amplifier 19 and passes through sync separators 20, 21 and a vertical integrator 22 to separate the vertical component of the sync signal, which acts to trigger a monostable multivibrator 23, the output of which is fed to a phase comparator 24.

An optical detector device 27 having a lamp light source 26 is provided for the purpose of obtaining a signal having a frequency and a phase corresponding to the speed of rotation and phase of the head drum 7. This signal has a frequency of 240 c.p.s. and is shaped by a shaper 28 and reduced to a signal of 60 c.p.s. by divider 29. This signal is fed to phase comparator 24 as another input thereto so that a voltage is formed which is proportional to the phase difference between the two inputs to the phase comparator. The voltage signal is supplied through a filter 30 to an oscillator 31 to serve the purpose of controlling the oscillation frequency of the oscillator 31. The output of the oscillator is amplified by an amplifier 32 to supply synchronous motor 6. The phase difference between the two inputs to the phase comparator 24 depends upon the position of head drum 7. The phase difference produces a voltage output which acts to change the phase of oscillator 31. The motor 6 is accelerated or decelerated according to the phase change so that the head drum rotates in synchronism with the vertical sync signal in the video signal being recorded.

The output of divider 29 is transformed by a filter 33 into a sinusoidal wave, which is amplified by an amplifier 34 to supply the capstan motor 3. Thus, the capstan motor 3 is driven at a speed directly associated with the speed of rotation of the head drum 7. As a result, capstan 2 operates in the following relation to the head drum 7, and the tape 1 is moved in the longitudinal direction by a predetermined distance during each revolution of the head drum 7. The output of shaper 28 reaches a control signal recording head 17 by way of a filter 35 and a control track amplifier 36 to form a control track along one edge of the tape 1.

During the reproducing operation, a signal obtained from a suitable power source 37 having a frequency of 60 c.p.s. is transformed into a signal of 240 c.p.s. by a multivibrator 38 and amplified by amplifier 32 to supply synchronous motor 6 for driving the head drum 7. In the same manner as in the recording operation, a signal is obtained from optical detector device 27 in response to rotation of the head drum 7 and fed through shaper 28 and filter 35 to a phase comparator incorporated in a servo amplifier 39 for the capstan. The control signal recorded along the tape edge is reproduced by a control head 17 and supplied through a reproduction amplifier 40 to the phase comparator in said servo amplifier 39 as a second input. The comparator produces a voltage proportional to the phase difference between the two signals, which is supplied through a filter to the oscillator to control oscillation frequency of the oscillator having a value of 60 c.p.s. The output of the oscillator is amplified by amplifier 34 to supply the capstan motor 3. The phase comparator in the servo amplifier 39 operates in response to the phase relation between the two input signals, the phase difference therebetween producing an output which serves to increase or decrease the frequency of the oscillator. As a result, the speed of capstan motor 3 is controlled so as to move the tape 1 forwardly by a predetermined distance during each revolution of the head drum enabling the plurality of heads to follow the record tracks with accuracy.

It is apparent from the foregoing description that the conventional system is necessarily complicated and expensive. In contrast to this, the present invention provides a wideband signal magnetic recording and reproducing apparatus which requires only a limited maintenance service and is simple in operation principle.

One preferred embodiment of the present invention will now be described with particular reference to FIGS. 4 to 9.

Figure 4:
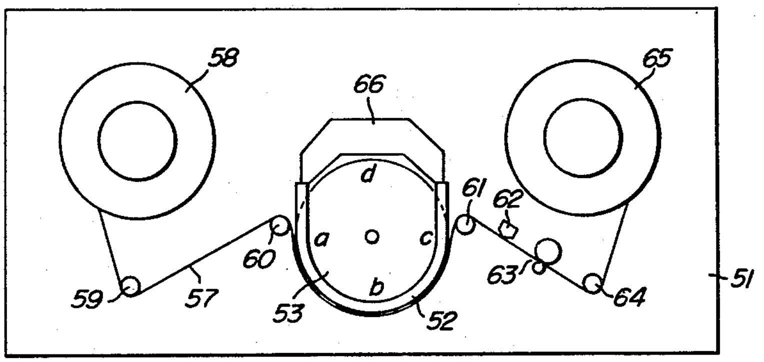
FIG. 4 is a plan view illustrating a magnetic recording and reproducing apparatus embodying the present invention.
Figure 5:
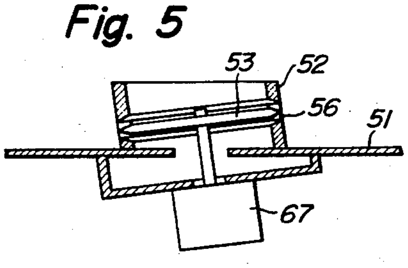
FIG. 5 is a cross-sectional view of the essential part of the apparatus shown in FIG. 4.
Figure 6:
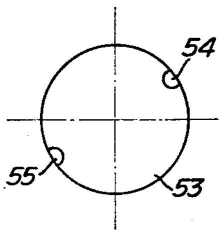
FIG. 6 is a plan view showing the rotary head drum of the apparatus shown in FIG. 4.

The present apparatus including a rotary magnetic head adapted to be driven directly by a reference signal has a tape drive mechanism one form of which is illustrated in FIGS. 4 to 6. Base plate 51 is commonly called a tape transport panel. A cylindrical tape guide 52 is formed with a gap or slit 56 so that the extremities of two magnetic heads 54 and 55 arranged on the periphery of a rotary head drum 53 extend outwardly clear of the tape guide. The axis of the tape guide 52 is slightly inclined with respect to a vertical to the base plate 51. Accordingly, the rotary head drum 53, accommodated in the tape guide coaxially therewith, and a motor provided for driving the rotary head drum 53 are also inclined to the same extent.

A magnetic tape 57 is paid out from a supply reel 58 to pass over a first idler 59 having an axis vertical to the base plate 51 and a second idler 60 having an axis parallel to the axis of the tape guide 52 and adjustably positioned on the base plate to place the tape 57 in contact with the tape guide to proceed on the latter at its one end. Then, after recording or reproduction has been made under the action of magnetic heads 54 and 55 mounted on the rotary head drum 53, the tape leaving the guide at its other end passes over another second idler 61, a control signal recording and reproducing head 62, a capstan mechanism 63 and another first idler 64 to be wound about a take-up reel 65.

An electromagnetic shield plate 66 is provided along the semicircular back portion *a–d–c* of the tape guide 52 which is out of contact of the tape. The shield plate 66 is formed of a material such as copper or iron and has a shielding effect such as to prevent any unwanted noise from being picked up during the time the tape is not swept by the magnetic heads 54 and 55.

Referring to FIG. 6, the rotary head drum illustrated has two magnetic heads 54 and 55 mounted thereon in diametrically opposing relation to each other, the axis of the rotary head drum being indicated. The head drum thus takes the form of a rotor which is driven by a kind of synchronous motor 67. Since the rotor 53 is more or less inclined to the direction of tape travel, it will be apparent that a series of magnetized zones are formed on the magnetic tape by means of magnetic heads 54 and 55 when the magnetic tape 57 is run along the periphery of the rotor 53 in sliding relation thereto, as indicated at 68 and 69 in FIG. 7. The contact between the tape and the heads can be limited to the semicircumferential peripheral region of the cylindrical tape guide by properly selecting the positions of the second idlers 60 and 61. With this arrangement, one of the magnetic heads comes in contact with the tape when the other magnetic head leaves it.

One practical application of the present invention to the recording and reproduction of television signals will next be described with reference to FIGS. 4 to 7. In this application, the rotary head drum 53 has a diameter of 220 mm. and the magnetic heads 54 and 55 mounted on the rotary drum are formed of a material such as Alperm ferrite, having an impedance of approximately 1 KΩ at a frequency of 3 mc. The synchronous motor employed for driving the rotary head drum 53 is a four-pole brushless direct-current motor, which is supplied with a D.C. voltage of approximately 30 v. and has a rotation speed of 1800 r.p.m. at a synchronous input frequency of 60 c.p.s.

The magnetic tape 57 is a video tape of one-inch width including a thin base strip coated with iron oxide and is run along the semicircular arc *a–b–c* of the rotary head drum at a speed of approximately 38 cm./sec. Accordingly, the speed of the magnetic tape relative to the magnetic heads is approximately 20 m./sec. With the rotary head drum 53 inclined relative to the direction of tape travel at an angle of approximately 3 degrees, the magnetic heads 54 and 55 mounted on the drum described loci 68 and 69 in FIG. 7, as described hereinbefore. Also, as pointed out above, idlers 60 and 61 are positioned so as to limit the contact of the magnetic heads 54 and 55 with the magnetic tape to the semicircular region *a–b–c*.

With this arrangement, in which the relative speed between the magnetic heads and the magnetic tape is approximately 20 m./sec. and the magnetic heads are formed of Alperm ferrite, each having a gap of 2 μm. and the record tracks have a width of 300 μm., an output of 1 mv. peak to peak can be obtained between the terminals of the magnetic heads and signals at a frequency of approximately 3.5 mc. can be recorded and reproduced with success.

Figure 8:
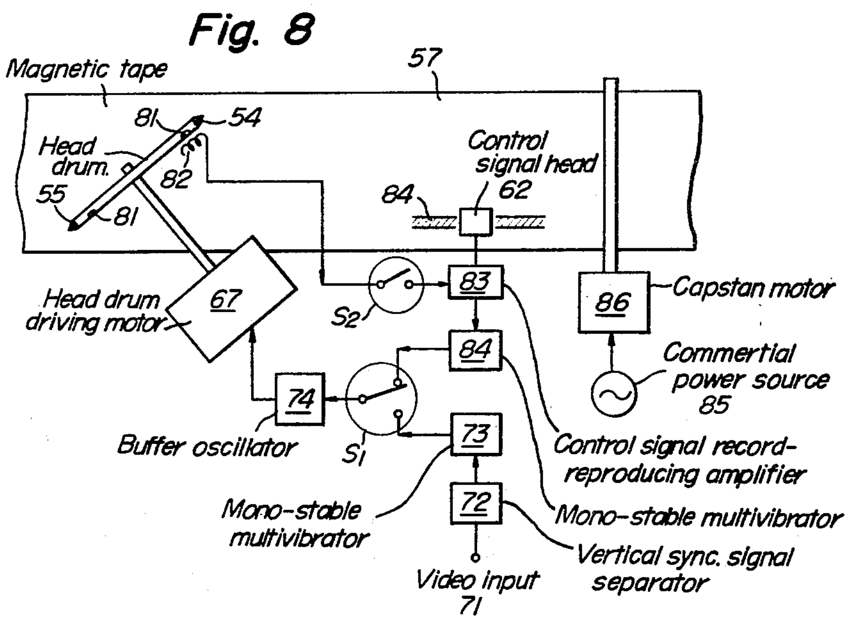
FIG. 8 is a block diagram illustrating the control system of the present apparatus.

In the recording operation of the control system shown in FIG. 8, the composite video signal deduced from a television receiver or a television camera is fed through input terminal 71 to vertical sync signal separator 72. The output or vertical sync signal, from separator 72 is used to trigger a monostable multivibrator 73 so that the output of the latter acts through a switch S1 to lock a buffer oscillator 74. The output frequency of the buffer oscillator 74 is 60 c.p.s., which is the same as the frequency of the vertical sync signal. The output of buffer oscillator 74 is used to drive head drum drive motor 67.

Figure 9:
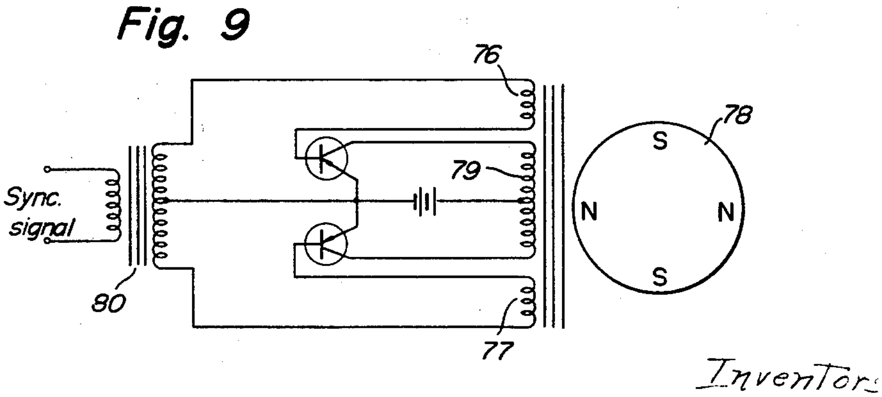
FIG. 9 is a wiring diagram of a brushless direct-current motor having a fixed-pole rotor usable in the present apparatus for driving the rotary head drum.

As one example of such drive motor 67, a brushless direct-current motor will next be outlined with reference to FIG. 9.

In FIG. 9, the stator of the motor has control and drive windings 76 and 77 in the form of a base and a collector coil of a transistor relaxation oscillation circuit. The motor rotor 78 is formed of permanent magnet and is caused to rotate continuously under the electromagnetic forces acting between the permanent magnet rotor 78 and the magnetic field formed by the stator winding 79 due to oscillation of the transistor circuit. Rotation of the motor is synchronized by an external signal, for example, the sync signal fed to the primary side of a transformer 80 connected in series with the base coil. Where the drive motor used is of the four-pole brushless type, it can operate strictly in synchronism with the vertical sync signal mentioned above at a speed of 1800 r.p.m. Accordingly, the magnetic heads 54, 55 are held in contact with the magnetic tape just for one-sixtieth second. This time of contact corresponds to one field of the television information. On the other hand, the composite video signal is modulated by an appropriate modulator, for example, of the FM type and fed through recording amplifiers into magnetic heads 54 and 55.

At the same time, in each revolution of the rotary head drum two electric pulses are induced in a detector coil 82 fixed to the base plate 51 by means of a permanent magnet 81 secured to the drum. The pulses are directed through switch S2 and control signal recording and reproducing amplifier 83 to a control signal head 62 fixed to the base plate 51 to be recorded on the magnetic taps 57.

Figure 7:
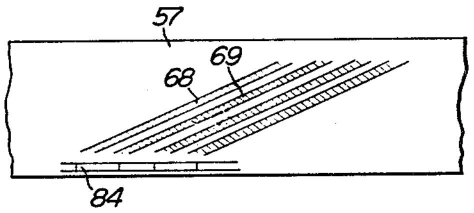
FIG. 7 illustrates record tracks formed on the magnetic tape in the apparatus of FIG. 4.

Referring to FIG. 7, which illustrates magnetized zones formed on the magnetic tape by the above recording process, the diagonal loci or tracks 68 and 69 are those formed by magnetic heads 54 and 55 while the locus or track 84 extending along the lower edge of the tape is one formed by the control signal head 62.

In the reproducing process, the control signal recorded on the magnetic tape is picked up to pass through control head 62 and amplifier 83 to trigger monostable multivibrator 84, the output of which passing through switch S1 triggers buffer oscillator 74 as in the recording process. The output of the buffer oscillator 74 acts to cause the drum driving motor 67 to rotate in synchronism.

On the other hand, the head drum is rotatable at a predetermined speed throughout the recording and reproducing process by use of a hysteresis synchronous motor is a capstan motor 86, which is supplied by a commercial power source of 60 c.p.s. and has a fixed speed of rotation throughout the recording and reproducing process. Also, by this means, a fixed phase relationship can be obtained between the vertical sync signal or control signal and the rotation of magnetic heads 54 and 55. It follows, therefore, that the magnetic heads 54 and 55 during reproduction can retrace the loci described during the recording process to fulfil the reproducing purpose.

It is desirable that the switchover of the magnetic heads is effected during the vertical blanking period, in which no picture appears on the screen of the television receiver. This requirement can be met by employing a monostable multivibrator 73 having an appropriate preselected delay time to properly phase the rotation of the magnetic heads since the cycle period of 1/60 second of the vertical sync signal is equal to the time required to trace each length of the tracks 68 and 69 described on the tape by the magnetic heads 53 and 54 and also since the latter are rotated strictly in synchronism with the vertical sync signal as described above. It will be understood that in this manner the picture appearing on the television receiver can be kept free from any adverse effects of the switching of the magnetic heads.

As apparent from the foregoing, the apparatus of the present invention employs extremely simplified means for driving the tape and the rotary head drum, thus is reduced in manufacturing and maintenance costs, and has a highly improved operational stability, compared with conventional recording and reproducing apparatus of the type described hereinbefore.

In the illustrated example of conventional apparatus, the capstan motor during recording operation is driven by a signal obtained by reducing the frequency of, shaping and amplifying the signal taken in response to rotation of the rotary head drum, and during reproduction is driven by amplification of the output of a variable frequency oscillator, which is controlled by an error voltage proportional to the phase difference between a signal taken in response to rotation of the rotary head drum and subsequently shaped and a control signal taken through the control head. In comparison, the capstan motor in the apparatus of the present invention is arranged to be driven directly from, for example, a commercial power source during both recording and reproducing processes, as described hereinbefore.

Further, in the conventional apparatus, the rotary head drum during the recording process is driven by a signal obtained by amplification of the output frequency of a variable frequency oscillator, which is controlled by an error signal obtained through the phase comparison between the vertical sync signal taken from the picture information and a signal taken in response to rotation of the rotary head drum, and during reproduction by a signal obtained by amplification of the output signal of a separately provided standard oscillator. In contrast, with the apparatus of the present invention, the purpose can be fulfilled by employing in an open circuit control system a motor having a fixed-pole rotor arranged to directly drive the rotary head drum by a signal obtained during the recording operation by amplification of the vertical sync signal in the picture information and during reproduction by amplification of the control signal reproduced through the control head.

Having described and shown herein a preferred embodiment of the present invention, it is to be understood that it is not limited to the details set forth but many changes and modifications may be made without departing from the scope and spirit of the invention as defined in the annexed claims.

What is claimed is:

1. A magnetic tape recording and reproducing apparatus comprising a magnetic tape, a rotating head including a magnetic transducer for recording and reproducing a video signal, said transducer being adapted to successively sweep across said magnetic tape at an angle to the longitudinal axis thereof, means for deriving a signal responsive to a synchronizing signal contained in said video signal, a motor operatively connected to drive said rotating head, said motor rotating in synchronization to said signal responsive to said synchronizing signal contained in the video signal, the rotor of said motor having magnetic poles at specific angular positions along the periphery thereof, means for imprinting record tracks of said video signal on said magnetic tape with said rotating head driven by said motor, means for deriving an electric signal dependent upon the rotation of said rotating head, means for recording said electric signal along one edge of said magnetic tape during an apparatus recording mode, means for reproducing the recorded electric signal during an apparatus reproducing mode, and means for driving said motor in synchronization with the reproduced electric signal.

2. A magnetic tape recording and reproducing apparatus comprising a magnetic tape, a rotating head including a magnetic transducer for recording and reproducing a video signal, said transducer being adapted to successively sweep across said magnetic tape at an angle to the longitudinal axis thereof, means for deriving a signal responsive to a synchronizing signal contained in the video signal, a rotor of said motor being constructed of a permanent magnet, the control and drive windings of said motor consisting of respectively a base coil and collector coil of a transistor multivibrator circuit, means for imprinting record tracks of said video signal on said magnetic tape with said rotating head being driven by said motor, means for deriving an electric signal dependent upon the rotation of said rotating head, means for recording said electric signal along one edge of said magnetic tape during recording, means for reproducing the recorded signal during reproduction, and means for driving said motor in synchronization with said reproduced electric signal.

3. A recording and reproducing apparatus for recording and reproducing wide band signals on a magnetic tape comprising a rotary head including a magnetic transducer adapted to successively sweep across said magnetic tape at an angle to the longitudinal axis thereof, a periodic reference signal source, means for deriving a signal responsive to said periodic reference signal source, an electric motor operably connected to drive said rotary head in synchronization with the derived signal, said motor having a rotor with poles spaced thereabout at fixed angular positions, said rotary head being driven by said motor in a fixed phase relation to said reference signal to thereby describe record tracks on said magnetic tape.

4. A recording and reproducing apparatus for recording and reproducing television signals on a magnetic tape comprising a rotary head including a magnetic transducer adapted to successively sweep across said magnetic tape at an angle to the longitudinal axis thereof, means for deriving an electric signal responsive to a synchronizing signal included in said television signals, an electric motor operable in synchronism with said electric signal and having a rotor having poles spaced thereabout at fixed angular positions, means for forming record tracks of the television signal to the magnetic tape through rotation of said rotary head, said rotary head being secured to the shaft of the motor, means for deriving an electric signal dependent upon the rotation of said rotary head, and means for recording said electric signal along one edge of the magnetic tape.

5. A magnetic tape recording and reproducing apparatus for recording and reproducing wide band signals on a magnetic tape comprising a rotary head including a magnetic transducer adapted to successively sweep across said magnetic tape at an angle to the longitudinal axis thereof, a source of signals to be recorded including a periodic signal, means for deriving an electric signal responsive to said periodic signal, an electric motor operable in synchronism with the electric signal and having a rotor with magnetic poles spaced thereabout at fixed angular positions, said head being operatively connected to be driven by said motor, means for forming record tracks on said magnetic tape through rotation of said rotary head, means for deriving an electric signal dependent upon the rotation of said rotary head, means for recording said derived electric signal along one edge of the magnetic tape, means for reproducing said derived electric signal recorded on the magnetic tape to obtain therefrom a control signal responsive to the electric signal reproduced, and means for utilizing said control signal to drive said electric motor for driving said rotary head to reproduce the record tracks on the magnetic tape.

References Cited

UNITED STATES PATENTS

| | | | |
|---|---|---|---|
| 3,175,034 | 3/1965 | Kihara | 178—6.6 |
| 3,179,870 | 4/1965 | Maxey | 178—6.6 |

JOHN W. CALDWELL, *Primary Examiner.*

H. W. BRITTON, *Assistant Examiner.*